3,804,832
DERIVATIVES OF 3-HETEROCYCLYLMERCAPTO-
METHYL 7-AMINOCEPHALOSPORANIC ACIDS
Hans Bickel, Binningen, and Johannes Mueller, Arles-
heim, Switzerland, assignors to Ciba-Geigy Corpora-
tion, Ardsley, N.Y.
No Drawing. Filed April 28, 1971, Ser. No. 138,353
Claims priority, application Switzerland, May 4, 1970,
6,671/70; June 4, 1970, 8,379/70; July 6, 1970,
10,157/70; Dec. 10, 1970, 18,359/70
Int. Cl. C07d 99/24
U.S. Cl. 260—243 C
11 Claims

ABSTRACT OF THE DISCLOSURE

Compounds of the formula

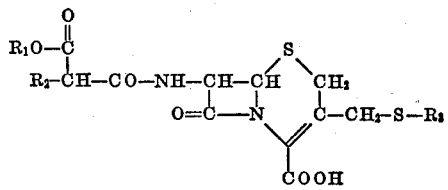

in which $R_1$ represents a lower alkyl residue, and $R_2$ represents hydrogen or a lower alkoxy-carbonyl residue, and in which $R_3$ represents a heterocyclic residue of aromatic character bound through a carbon atom to the sulphur atom, and which heterocyclic residue contains at least 2 nitrogen atoms and also a further heteroatom which is selected from the group consisting of nitrogen, oxygen and sulphur. They have antimicrobial activity.

This invention provides new therapeutically active derivatives of 7-amino-cephalosporanic acid of the Formula I

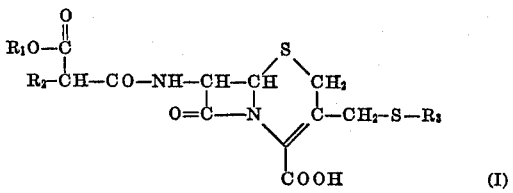

in which $R_1$ represents a lower alkyl residue, and $R_2$ represents hydrogen or a lower alkoxy-carbonyl residue, and in which $R_3$ represents a heterocyclic residue of aromatic character bound through a carbon atom to the sulphur atom, and which heterocyclic residue contains at least 2 nitrogen atoms and also a further heteroatom which is selected from the group consisting of nitrogen, oxygen and sulphur, and salts thereof.

The heterocyclic residue $R_3$ contains 5 or 6, and preferably 5, ring atoms and may be connected to a fused-on benzene ring. Both rings may be substituted by aliphatic or aromatic hydrocarbon residues, especially lower alkyl residues such as methyl, ethyl, propyl, isopropyl, n-butyl, isobutyl, tert.-butyl, lower alkylthio residues, cycloalkyl residues such as cyclopentyl, cyclohexyl, or by aryl residues such as phenyl or substituted phenyl, for example, phenyl substituted by one or more nitro groups or halogen atoms or lower alkyl or lower alkoxy groups, or by thienyl, especially thienyl-(2). As examples of heterocyclic residues there may be mentioned:

1H-1,2,3-triazol-5-yl,
1,3,4-triazol-2-yl,5-methyl-1,3,4-triazol-2-yl,
1H-1,2,4-triazol-5-yl,
1-phenyl-3-methyl-1H-1,2,4-triazol-5-yl,
4,5-dimethyl-4H-1,2,4-triazol-3-yl,
4-phenyl-4H-1,2,4-triazol-3-yl,
1H-tetrazol-5-yl,
1-methyl-1H-tetrazol-5-yl,
1-ethyl-1H-tetrazol-5-yl,
1-n-propyl-1H-tetrazol-5-yl,
1-isopropyl-1H-tetrazol-5-yl,
1-n-butyl-1H-tetrazol-5-yl,
1-cyclopentyl-1H-tetrazolyl-5-yl,
1-phenyl-1H-tetrazol-5-yl,
1-p-chlorophenyl-1H-tetrazol-5-yl,
1,2,3-thiadiazol-5-yl,
1,3,4-thiadiazol-2-yl,
1-,2,4-thiadiazol-3-yl,
1,2,4-thiadiazol-5-yl,
3-methyl-1,2,4-thiadiazol-5-yl,
2-methyl-1,3,4-thiadiazol-5-yl,
2-methylthio-1,3,4-thiadiazol-5-yl,
2-ethyl-1,3,4-thiadiazol-5-yl,
2-n-propyl-1,3,4-thiadiazol-5-yl,
2-isopropyl-1,3,4-thiadiazol-5-yl,
2-phenyl-1,3,4-thiadiazol-5-yl,
1,2,4-oxadiazol-5-yl,
1,2,3-oxadiazol-5-yl,
1,3,4-oxadiazol-5-yl,
2-methyl-1,3,4-oxadiazol-5-yl,
2-ethyl-1,3,4-oxadiazol-5-yl,
2-phenyl-1,3,4-oxadiazol-5-yl,
2-p-nitrophenyl-1,3,4-oxadiazol-5-yl,
2[thienyl(2)]-1,3,4-oxadiazol-5-yl,
thiatriazol-5-yl, and also corresponding residues containing 6 ring atoms.

The salts of the new compounds are metal salts, primarily those of therapeutically usable alkali metals or alkaline earth metals, such as sodium, potassium, ammonium, calcium, or salts with organic bases, for example, triethylamine, N-ethyl-piperidine, dibenzyl-ethylene diamine, procaine, di-isopropylamine, and ethanolamine. If the group $R_3$ is basic, internal salts can be formed.

The new compounds possess an especially good antibacterial action. They are active against gram-positive and primarily against gram-negative bacteria, for example, against *Staphylococcus aureus* penicillin-resistant, *Escherichia coli*, *Klebsiella pneumoniae*, *Salmonella typhosa* and *Bacterium proteus*, as has been found also in animal tests, for example, on mice. They can therefore be used for combating infections, which are caused by such microorganisms, and also as additions to foodstuffs, for preserving foodstuffs or as disinfecting agents. Especially valuable are compounds, in which the acyl residue in the 7-position is a di-methoxycarbonyl-acetyl, a mono-methoxy-carbonyl acetyl, a mono-ethoxy-carbonyl-acetyl residue, and $R_3$ is a tetrazol-5-yl or 1,3,4-thiadiazol-5-yl residue that may be substituted in the 2-position.

The new compounds are obtained by reacting a compound of the Formula II

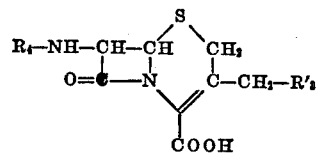

in which $R_4$ represents the acyl residue of the Formula Ia

and in which $R_3'$ represents a functionally modified, in particular esterified hydroxyl group, for example a hydroxy group esterified by a mineral acid, such as a hydrogen halide acid, for instance a hydriodic acid or hydrofluoric acid, especially a hydrobromic or hydrochloric acid, or by a carboxylic acid which may be substituted, for instance, by halogen, such as a lower alkane acid, for example propionic acid, chloroacetic acid, above all, acetic acid, or by an, especially monocyclic, arylcarboxylic acid or aryl lower alkylcarboxylic acid, for instance benzoic acid or phenylacetic acid, or an ester or a salt of such a compound, with a thiol of the Formula Ib

HS—R₃     (Ib)

in which $R_3$ has the meaning given in connection with Formula I, or a metal salt thereof, or by reacting a compound of the Formula II, in which $R_4$ is hydrogen and $R_3'$ represents S—$R_3$, or an ester or a salt of such compound, with an acylating agent, which contains the acyl residue of the Formula Ia, and, if desired, splitting up any ester groups present, and, if desired, converting the compound so obtained into a metal salt thereof, such as an alkali metal or alkaline earth metal salt, or a salt with ammonia or an organic base, or forming from the salt obtained the free carboxylic acid or, if desired, an internal salt.

The compounds used as starting materials are known or can be made by methods in themselves known. Compounds of the Formula II, in which $R_3'$ represents the acetoxy group and $R_4$ represents an acyl residue of the Formula Ia, and their manufacture, are described in French patent specification No. 1577253. Salts thereof are, for example, salts of alkali metals or alkaline earth metals or zinc or of organic bases, for example, triethylamine, di-isopropylamine or ethanolamine. Compounds of the Formula II, in which $R_4$ represents hydrogen and $R_3'$ represents S—$R_3$, are obtained, for example, by reacting 7-amino-cephalosporanic acid or a salt thereof with a thiol or salt thereof in the same manner as that described for the 7-ACA acylated by the residue (Ia). They can also be obtained by reacting 7-acylamino-cephalosporanic acids, in which "acyl" means the acyl residue of any desired carboxylic acid, for example, an acetyl, propionyl, pentanoyl, hexanoyl, phenylacetyl or the amino-adipoyl residue (in which case the starting material is Cephalosporin C), with a thiol or salt thereof in the same manner as that described for 7-ACA acylated by the residue (Ia), and splitting up the N-acyl residue, for example, as described in French patent specification No. 1394,820.

As metal salts of thiols there may be used especially alkali metal salts, such as the sodium or potassium salt. The salts can be produced, for example, by reacting the thiol with a carbonate, bicarbonate or hydroxide of an alkali metal.

Esters of compounds of the Formula II are those in which the carboxyl group in the 4-position of the dihydrothiazine ring is esterified. As ester group, when necessary or desired, that are intended to be split up, there come into consideration primarily those that can be easily split up to form the free carboxylic acid, for example, by solvolysis, hydrogenolysis, reduction, by neucleophilic exchange or by photolysis.

For example, certain esterified carboxyl groups can be converted by reduction, for example, by treatment with nascent hydrogen, into the free carboxyl groups. Such esterified carboxyl groups are, especially carbo-lower-alkoxy groups, in which lower alkyl contains in β-position halogen atoms, especially chlorine atoms, and especially carbo-2,2,2-trichloroethoxy groups, and also carbo-2-iodoethoxy groups. They can be converted into the free carboxyl groups by a method in itself known, preferably by treatment with nascent hydrogen under acid or neutral conditions, for example, with zinc in the presence of a suitable lower-alkane carboxylic acid such as acetic acid, especially slightly diluted, for example, acetic acid of 90% strength, or by treatment with a strongly reducing metal salt, such as cobalt-II-acetate in the presence of aqueous media.

A carbo-lower-alkoxy group, in which lower-alkyl is poly-branched in the α-position and/or contains in α-position residues of aromatic character, such as aromatic hydrocarbon groups that may be substituted, for example, phenyl residues, or heterocyclic groups of aromatic character, such as the 2-furyl group, for example, carbo-tert.-butoxy, and also carbo-tert.-pentoxy groups, or the carbo-diphenylmethoxy or carbo-2-furfuryloxy group, and also a carbocycloalkoxy group, in which cycloalkyl represents a polycyclic residue, such as the carbo-adamantyloxy group, can be converted into the free carboxyl groups by treatment with a suitable acid agent, such as a strong organic carboxylic acid, preferably a halogen-containing lower-alkene carboxylic acid, primarily trifluoracetic acid.

Esterified carboxyl groups capable of being converted into the carboxyl groups easily and under mild conditions are silylated carboxyl groups and also stannylated carboxyl groups. These are group which can be formed by the treatment of compounds containing free carboxyl groups, and also salts, such as alkali metal, for example, sodium salts thereof, with a suitable silylating agent, such as a tri-loweralkyl-silyl halide, for example, trimethyl silyl chloride, or a N-(tri-lower-alkyl-silyl)-N-$R_a$-N-$R_b$-amine, in which $R_a$ represents a hydrogen atom or a lower-alkyl group and $R_b$ represents a hydrogen atom, a lower-alkyl group or a tri-lower-alkyl-silyl group (see, for example, British patent specification No. 1073530), or by treatment with a suitable stannylating agent, such as a bis-(tri-lower-alkyl-tin)-oxide, for example, bis(tri-n-butyl.-tin)-oxide, a tri-lower-alkyl-tin hydroxide, for example, triethyl-tin hydroxide, a tri-lower-alkyl-lower-alkoxy-tin, tetra-lower-alkoxy-tin or tetra-lower-alkyl-tin compound, and also a tri-lower-alkyl-tin halide, for example, tri-n-butyl-tin chloride (see, for example, Dutch Auslegeschrift 67/17107). The above-mentioned starting materials containing silylated or stannylated carboxyl groups can be converted into the desired compounds containing free carboxyl groups, for example, by treatment with a, preferably neutral, hydrogen-donating agent, especially water or an alcohol, such as a lower-alkanol, for example, ethanol.

The reaction with the thiol is carried out as described in Belgian patent specification No. 617687 or in Dutch application No. 6805179 in an inert solvent, such as an alcohol, ether, ketone, N,N-disubstituted amide, for example, dimethylformamide, dimethylacetamide, with the use of salts preferably in a water-miscible inert solvent or in a mixture of water and such a solvent, for example, acetone, methanol, ethanol, dioxane, tetrahydrofurane, or aqueous solutions thereof, preferably in aqueous acetone. The reaction temperature is +15 to 70° C., and preferably 40 to 60° C. The pH value of the solution is preferably maintained at between 5.0 and 7.5. When necessary there is added a buffer, for example, sodium acetate, or, when the compound is used in the form of an alkali metal salts, there is added, for example, acetic acid.

The acylation to introduce the acyl residue (Ia) is carried out as described in French patent specification No. 1577253, for example, by means of an acid halide, for example, an acid chloride, or a mixed anhydride, for example, a mixed anhydride with monoesterified carbonic acid or with pivalic acid or preferably with trichloracetic acid, or with the free acid itself in the presence of a condensing agent, such as a carbodiimide for example dicyclohexyl-carbodiimide.

Preferably there are used those starting materials which lead to the especially active final products mentioned above.

The cephalosporin derivatives used as starting materials are known or can be made by methods in themselves known.

The invention also includes those modifications of the process in which there is used as starting material a compound obtainable as an intermediate product at any stage in the process and the remaining stages of the process are carried out or in which the process is interrupted at any stage, or in which the starting materials are formed under the reaction conditions used, or in which the reaction components are optionally present in the form of their salts.

The new compounds are useful as medicaments, for example, in the form of pharmaceutical prepartions. These preparations contain the compounds in admixture with a pharmaceutical organic or inorganic, solid or liquid carrier suitable for enteral, topical or parenteral administration. For making the carriers there are used substances that do not react with the new compounds, for example, water, gelatine, lactose, starches, stearyl alcohol, magnesium stearate, talc, vegetable oils, benzyl alcohols, gums, propylene glycol, polyalkylene glycols, white petroleum jelly, cholesterol, or other known carriers for medicaments. The pharmaceutical preparations may be in the form, for example, of tablets, dragées, salves, creams, capsules or in liquid form as solutions, suspensions or emulsions. If desired, they may be sterilized and/or may contain auxiliary substances, such as preserving, stabilizing, wetting or emulsifying agents, solution promoters or salts for changing the osmotic pressure or buffers. They may also contain other therapeutically valuable substances. The preparations are made up by the usual methods.

The following examples illustrate the invention. In the thin layer chromatography described in these examples the following systems were used:

System 52 A=n - Butanol - glacial acetic acid - water (67:10:23)
System 87=Isopropanol-formic acid-water (77:4:19)
System 101=n-Butanol-pyridine-glacial acetic acid-water (38:24:8:30)
System 101A=n-Butanol - pyridine - glacial acetic acid-water (42:24:4:30)
System 110=n-Butanol-ethyl acetate - pyridine - glacial acetic acid-water (42:21:21:6:10)

In the examples, "MIC" means the minimum inhibitory concentration which is measured by the gradient plate test described in "Antiobiotics," vol. I by Gottlieb and Shaw, New York 1967, page 508, a modified method of that described by V. Bryson and R. Szybalski, Science 116, 45 (1952). The MIC is determined on strains of *Staphylococcus aureus* SG 511 (sensitive to penicillin) or *Staphylococcus aureus* 14, *Escherichia coli* 2018, *Klebsiella pneumoniae* and/or *Salmonella typhimuri*.

EXAMPLE 1

1.86 grams (5 mmol) of 7-carbomethoxy-acetylamino-cephalosporanic acid (see French patent specification No. 1577253) (I) or 0.70 gram (6 mmol) of 2-methyl-1,3,4-thia-diazoline-5-thione (II) are dissolved in 80 ml. of an aqueous solution of dipotassium phosphate of 5% strength. The pH-value of the solution is 6.5. The solution is stirred under nitrogen for 8 hours at 60° C. The pH-value remains constant to the end of the reaction. The reaction solution is pre-extracted at a pH-value of 6.5 three times with 30 ml. of ethyl acetate, the pH-value of the aqueous solution is then adjusted to 2.5 by means of 28 ml. of 1 N-hydrochloric acid, and extracted three times with 60 ml. of ethyl acetate on each occasion, washed with a little water and sodium chloride solution, dried with sodium sulphate and the solution is evaporated in vacuo.

There is obtained 7-carbomethoxyacetylamino-3-(2-methyl - 1,3,4 - thiadiazole-5-ylthio)-methyl-ceph-3-em-4-carboxylic acid (III), which can be purified with ethyl acetate over a column of silica gel. In methanol the compound shows in the ultra-violet spectrum a $\lambda_{max}$ at 272 nm. ($\epsilon$=12,100).

In the thin layer chromatograms over silica gel in the system ethyl acetate-glacial acetic acid (9:1) the following $R_f$-values were obtained:

(I)   $R_f$=0.50
(II)  $R_f$=0.84
(III) $R_f$=0.28

MIC: *St. aureus* 511=0.08 $\gamma$/ml.; *St. aureus* 14=0.05 $\gamma$/ml.; *E. coli* 2018=2 $\gamma$/ml.; *K. pneum.*=1 $\gamma$/ml.; *S. typh.*=2 $\gamma$/ml.

EXAMPLE 2

1.93 grams (5 mmol) of 7-carbethoxy-acetylamino-cephalosporanic acid (see French patent specification No. 1,577,253) and 0.70 gram (6 mmol) of 2-methyl-1,3,4-thiadiazoline-5-thione are dissolved in 60 ml. of an aqueous solution of dipotassium phosphate of 5% strength. By the addition of 30 ml. of an aqueous solution of potassium dihydrogen phosphate of 5% strength the pH-value is adjusted to 6.5. The solution is stirred for 8 hours at 60° C. under nitrogen. The cooled reaction mixture (pH=6.5) is extracted three times with 30 ml. of ethyl acetate on each occasion. The aqueous solution is then adjusted to a pH-value of 2.5 by means of 1 N-hydrochloric acid (about 30 ml.), and extracted three times with 100 ml. of ethyl acetate on each occasion, washed with a small amount of water and sodium chloride solution, dried with sodium sulphate and the solution is evaporated to dryness in vacuo.

There is obtained 7-carbethoxy-acetylamino-3-(2-methyl-1,3,4 - thiadiazole - 5 - ylthio)-methyl-ceph-3-em-4-carboxylic acid, which can be purified with ethyl acetate over a column of silica gel. In methanol this compound shows in the ultra-violet spectrum a $\lambda_{max}$ at 273 nm. ($\epsilon$=12,600).

The thin layer chromatogram on silica gel:

System 52A: $R_f$= 0.33
System 87: $R_f$=0.64

MIC: *St. aureus* 511=0.03 $\gamma$/ml.; *St. aureus* 14=0.025 $\gamma$/ml.; *E. coli* 2018=2 $\gamma$/ml.; *K. pneum.*=2 $\gamma$/ml.; *S. typh.*=4.5 $\gamma$/ml.

EXAMPLE 3

3.72 g. (10 mmols) of 7-carbomethoxyacetylamino-cephalosporanic acid and 1.39 g. (12 mmols) of 1-methyl-5-mercapto-tetrazol are dissolved in 130 ml. of 5% aqueous dipotassium phosphate. The pH value of the solution is 6.5. The solution is stirred for 8 hours at 60° C. under nitrogen. The pH remains constant until the reaction is complete. The reaction solution is pre-extracted three times at pH 6.5 with 100 ml. of ethyl acetate, then the aqueous solution is adjusted with 20% strength phosphoric acid to pH 3.0 and extracted three times with 200 ml. and twice with 100 ml. ethyl acetate on each occasion, washed with a small amount of water and sodium chloride solution, dried with sodium sulphate and the solution evaporated in vacuo.

7-carbomethoxyacetylamino - 3 - (1-methyl-tetrazol-5-ylthio)-methylceph-3-em-4-carboxylic acid which can be purified with ethyl acetate on a silica gel column is obtained. The sodium salt is obtained by dissolving the acid in 10 parts by volume of methanol, by adding 1.3 parts by volume of a 3-m. methanolic solution of sodium-α-ethylhexanoate and crystallizing with addition of ethyl acetate. Fractionated crystallization from a mixture of methanol and ethyl acetate yields the pure product.

In the ultra-violet spectrum $\lambda_{max}$=266 nm. ($\epsilon$=9800). Thin layer chromatogram on silica gel: the $R_f$ value in the system ethyl acetate-glacial acetic acid (9:1)=0.16; $R_{f_{52A}}$=0.26; $R_{f_{101A}}$=0.41; $R_{f_{101}}$=0.58. MIC: *St. aureus* 511=0.3 $\gamma$/ml.; *St. aureus* 14=0.2 $\gamma$/ml.; *E. coli* 2018=0.6 $\gamma$/ml.; *K pneum.*=0.4 $\gamma$/ml.; *S. typh.*=1 $\gamma$/ml.

EXAMPLE 4

238 mg. of 7-[di-(methoxycarbonyl)-acetylamino]-cephalosporanic acid (cf. French Pat. No. 1577253) are dissolved in 4.5 ml. of 10 percent phosphate buffer pH 6.7, then 84 mg. of 5-mercapto-1-methyl-tetrazol are added to the solution and the pH is adjusted to 6.3 by adding dropwise 2.5 ml. of 10% dipotassium phosphate solution. The solution is stirred for 7½ hours at 60° C. under nitrogen. Extraction is effected with 50 and 30 ml. of ethyl acetate and the extract rejected. The aqueous solution is covered with ethyl acetate, adjusted to pH 2.4 by addition of 3.7 ml. of 1 N-hydrochloric acid, and extracted with 60 and 30 ml. ethyl acetate. The organic phases are washed twice with 5 ml. each of saturated sodium chloride solution, dried with sodium sulphate and concentrated in vacuo to about a volume of 10 ml. A slightly colored crude precipitate is formed on adding 15 ml. of pentane. This is further purified by chromatography on a column ($\phi$=2 cm.) of 10 g. of silica gel: the substance is dissolved in a small quantity of acetone and adsorbed on 0.5 g. of silica gel. This is poured on to the column, whereupon elution is effected with a mixture of chloroform and acetone (2:1). The first 40 ml. of eluate contain the 7-[di-(methoxycarbonyl)-acetylamino]-3-(1-methyl-tetrazol-5-ylthio)-methylceph-3-em - 4 - carboxylic acid, which can be isolated as a colorless powder. In the ultra-violet spectrum (in 0.1 N sodium bicarbonate solution $\lambda_{max}$=256 nm.).

Thin layer chromatogram on silica gel: $R_{f_{52A}}$=0.26 (starting material 0.34), $R_{f_{101}}$=0.55, $R_{f_{110}}$=0.39 (starting material 0.47).

EXAMPLE 5

About 6.5 g. (0.064 mol) of phosgene are condensed in a sulphating flask of 200 ml. capacity which is fitted with an agitator, with the aid of an acetone+carbon dioxide bath. Then 5.45 g. (0.035 mol) of solid malonic acid dimethyl ester monosodium salt are added under nitrogen with stirring at −10° C., and the mixture is allowed to react for ½ hour at this temperature. The excess phosgene is allowed to evaporate at room temperature and after brief evacuation the residue is dissolved in 16 ml. of methylene chloride. A solution of 10.5 g. (0.032 mol) of 7 - amino - 3 - (1 - methyl - tetrazol - 5 - ylthio)-methyl-ceph-3-em-4-carboxylic acid and 8.95 ml. (0.64 mol) of triethylamine in 70 ml. of dimethylformamide is quickly added dropwise at −50° C. and the reaction mixture stirred for 50 minutes at −10° C. The solvent is thereafter evaporated initially in a water-jet vacuum and subsequently in a high vacuum (water bath temperature 20° C.). The oily product is immediately dissolved in 100 ml. of phosphate buffer at pH 6.5 and extracted with 2× 100 ml. of ethyl acetate. The organic phases are discarded. The aqueous phase is covered with 250 ml. of ethyl acetate and adjusted to a pH of 2.4 by addition of 2 N hydrochloric acid while stirring thoroughly. A brown precipitation that occurs in the process is removed by centrifuging. The phases are then separated, the aqueous phase is saturated with sodium chloride and extraction with 2× 250 ml. of ethyl acetate is ffected. The organic extract solutions are washed successively with 2× 50 ml. of saturated sodium chloride solution, dried with sodium sulphate and evaporated to dryness in vacuo. The resinous residue (6.45 g.) is dissolved in 35 ml. of methanol and treated with 8.4 ml. of a 3-molar methanolic solution of sodium-α-ethyl-hexanoate whilst cooling in an ice bath. The sodium salt (4.8 g.) is precipitated by the rapid addition of 400 ml. of absolute ether whilst stirring vigorously. The acid (4.3 g.) is recovered by acidifying the aqueous solution of the sodium salt to pH 2.5 and extracting with ethyl acetate. The acid is dissolved in 8 ml. of acetone, the solution diluted with 16 ml. of chloroform and quickly chromatographed on a column of 200 g. of silica gel (height: diameter=8:1) with a mixture of chloroform/acetone (2:1). The first 460 ml. of eluate contain small amounts of oily impurities, and with the succeeding 400 ml. of solvent the 7-(di-[methoxycarbonyl]-acetylamino)-3-(1-methyl-tetrazol - 5 - ylthio)-methyl-ceph - 3 - em - 4 - carboxylic acid is eluted, which is obtained in pure form by crystallization from ethyl acetate.

UV spectrum: $\lambda_{max}$=253 nm., $\epsilon$=30800 (in 0.1-m. NaHCO$_3$ solution)

Optical rotation: $[\alpha]_D^{20}$=−7°±1° (in 0.1-m. NaHCO$_3$ solution)

In thin layer chromatography on silica gel:

$R_{f_{52A}}$=0.26 (bromacetyl-7ACA=0.40; 7-(di-[methoxycarbonyl]-acetylamino)-cephalosporanic acid=0.34)

$R_{f_{110}}$=0.39 (bromacetyl-7ACA=0.52; 7-(di-[methoxycarbonyl]-acetylamino)-cephalosporanic acid=0.47)

$R_{f_{101}}$=0.55 (Ceporin=0.39)

$R_{f_{101A}}$=0.42 (Ceporin=0.23)

$R_f$ in system ethyl acetate-glacial acetic acid (9:1) (15 cm. running distance)=0.25 (for bromacetyl-7ACA=0.40).

EXAMPLE 6

About 14 g. (0.14 mol) of phosgene are condensed in a sulphating flask of 350 ml. capacity which is fitted with an agitator, with the aid of an acetone+carbon dioxide bath. Then 11.6 (0.075 mol) of solid malonic acid dimethyl ester monosodium salt are added under nitrogen with stirring at −10° C., and the mixture is allowed to react for ½ hour at this temperature. The excess phosgene is allowed to evaporate at room temperature and after brief evacuation the residue is dissolved in 16 ml. of methylene chloride. A solution of 23.5 g. (0.068 mol) of 7-amino - 3 - (2 - methyl - 1,3,4 - thiadiazol - 5 - ylthio)-methylceph-3-em-4-carboxylic acid and 18.9 ml. of triethylamine in 140 ml. of dimethylformamide is quickly added dropwise at −50° C. and the reaction mixture stirred for 45 minutes at −10° C. The solvent is thereafter evaporated initially in a water-jet vacuum and subsequently in a high vacuum (water bath temperature 20° C.). The oily product is immediately dissolved in 200 ml. of phosphate buffer at pH 6.5 and extracted with 2× 200 ml. of ethyl acetate. The organic phases are discarded. The aqueous phase is covered with 500 ml. of ethyl acetate and adjusted to a pH of 2.4 by addition of 2 N hydrochloric acid while stirring thoroughly. A brown precipitation that occurs in the process is removed by centrifuging. The phases are then separated, the aqueous phase is saturated with sodium chloride and extraction with 2× 500 ml. of ethyl acetate is effected. The organic extract solutions are washed successively with 2× 80 ml. of saturated sodium chloride solution, dried with sodium sulphate and evaporated to dryness in vacuo. The resinous residue (10.85 g.) is dissolved in 100 ml. of acetone and treated with 14.1 ml. of a 3-molar methanolic solution of sodium-α-ethyl-hexanoate whilst cooling in an ice bath. The crude crystalline sodium salt (8.7 g.) is formed whose precpitation is completed by concentrating the reaction mixture in vacuo initially to half its volume and then adding slowly 200 ml. of absolute ether whilst stirring thoroughly. The corresponding acid (6.3 g.) is recovered by acidifying the solution of the sodium salt previously treated with activated charcoal to pH 2.5 and extracting it with ethyl acetate. The acid is adsorbed from an acetonic solution onto 30 g. of neutral silica gel. The dry adsorbate is charged onto a column of 300 g. of silica gel ($\phi$=4.5 cm., h.=45 cm.) and eluted with a mixture of 2 parts by volume of chloroform and 1 part by volume of acetone. The first 1000 ml. of eluate contain small amounts of oily impurities; with the succeeding 700 ml. of solvent the 7 - (di - [methoxycarbonyl] - acetylamino)-3 - (2 - methyl - 1,3,4 - thiadiazol - 5 - ylthio)-methyl-ceph-3-em-4-carboxylic acid is eluted, which is obtained in pure form by repeated crystallization from ethyl acetate and from acetone.

UV spectrum: $\lambda_{max}$=254 nm., $\epsilon$=32500 (in 0.1-m. NaHCO$_3$ solution)

Optical rotation: $[\alpha]_D^{20}$=−66°±1° (in 0.1-m. NaHCO$_3$ solution)

In the thin layer chromatography on silica gel:

$R_{f_{52A}}$=0.32 (bromacetyl-7ACA=0.40; 7-(di-[methoxycarbonyl]-acetylamino)-cephalosporanic acid=0.34)

$R_{f_{101A}}$=0.43 (Ceporin=0.23)

$R_f$ in system ethyl acetate-glacial acetic acid (9:1) (15 cm. running distance)=0.19 (for bromacetyl-7ACA=0.40).

We claim:
1. A compound of the Formula I

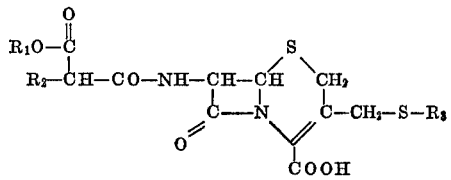

in which $R_1$ represents lower alkyl, and $R_2$ represents hydrogen or lower alkoxy-carbonyl, and in which $R_3$ represents (1) triazolyl, tetrazolyl, thiadiazolyl, oxadiazolyl or thiatriazolyl bound to the sulphur atom by way of a carbon atom or (2) said triazolyl, tetrazolyl, thiadiazolyl, oxadiazolyl or thiatriazolyl substituted by a member selected from the group consisting of lower alkyl, lower alkylthio, cycloalkyl having 5–6 carbon atoms, phenyl, phenyl substituted by one or more nitro groups or halogen atoms or halogen atoms or lower alkyl or lower alkoxy groups, and thienyl, or a therapeutically acceptable ester or a therapeutically acceptable salt thereof.

2. A compound of the Formula I as claimed in claim 1, in which $R_1$ represents lower alkyl, $R_2$ represents hydrogen or lower alkoxycarbonyl and $R_3$ represents unsubstituted, lower alkyl-substituted or lower alkylthio-substituted tetrazolyl, or a therapeutically acceptable salt thereof.

3. A compound of the Formula I as claimed in claim 1, in which $R_1$ represents lower alkyl, $R_2$ represents hydrogen or lower alkoxycarbonyl and $R_3$ represents unsubstituted, lower alkyl-substituted or lower alkylthio-substituted thiazolyl, or a therapeutically acceptable salt thereof.

4. A compound of the Formula I as claimed in claim 1, in which $R_1$ represents lower alkyl, $R_2$ represents hydrogen or lower alkoxycarbonyl and $R_3$ represents 2-methyl-1,3,4-thiadiazol-5-yl, or a therapeutically acceptable salt thereof.

5. A compound of the Formula I as claimed in claim 1, in which $R_1$ represents lower alkyl, $R_2$ represents hydrogen or lower alkoxycarbonyl and $R_3$ represents 3-methyl-1,2,4-thiadiazol-5-yl, or a therapeutically acceptable salt thereof.

6. A compound of the Formula I as claimed in claim 1, in which $R_1$ represents lower alkyl, $R_2$ represents hydrogen or lower alkoxycarbonyl and $R_3$ represents 1-methyltetrazol-5-yl, or a therapeutically acceptable salt thereof.

7. A compound of the Formula I as claimed in claim 1, in which $R_1$ represents methyl, $R_2$ hydrogen and $R_3$ 2-methyl-1,3,4-thiadiazol-5-yl or a therapeutically acceptable salt thereof.

8. A compound of the Formula I as claimed in claim 1, in which $R_1$ represents ethyl, $R_2$ hydrogen and $R_3$ 2-methyl-1,3,4-thiadiazol-5-yl, or a therapeutically acceptable salt thereof.

9. A compound of the Formula I as claimed in claim 1, in which $R_1$ represents methyl, $R_2$ hydrogen and $R_3$ 1-methyltetrazol-5-yl, or a therapeutically acceptable salt thereof.

10. A compound of the Formula I as claimed in claim 1, in which $R_1$ represents methyl, $R_2$ methoxycarbonyl and $R_3$ 1-methyl-tetrazol-5-yl, or a therapeutically acceptable salt thereof.

11. A compound of the Formula I as claimed in claim 1, in which $R_1$ represents methyl, $R_2$ methoxycarbonyl and $R_3$ 2-methyl-1,3,4-thiadiazol-5-yl, or a therapeutically acceptable salt thereof.

References Cited
UNITED STATES PATENTS

| | | | |
|---|---|---|---|
| 3,516,997 | 6/1970 | Takano et al. | 260—243 C |
| 3,557,104 | 1/1971 | Bickel et al. | 260—243 C |

NICHOLAS S. RIZZO, Primary Examiner

U.S. Cl. X.R.
424—246